(12) United States Patent
Robinson

(10) Patent No.: US 6,608,290 B1
(45) Date of Patent: Aug. 19, 2003

(54) METHOD OF HEATING METAL STRIP AND APPARATUS THEREOF

(75) Inventor: Philip S. Robinson, Sheffield (GB)

(73) Assignee: Avesta Sheffield Aktiebolag, Stockholm (SE)

( * ) Notice: Subject to any disclaimer, the term of this patent is extended or adjusted under 35 U.S.C. 154(b) by 0 days.

(21) Appl. No.: 09/914,611
(22) PCT Filed: Feb. 29, 2000
(86) PCT No.: PCT/SE00/00389
§ 371 (c)(1),
(2), (4) Date: Oct. 4, 2001
(87) PCT Pub. No.: WO00/52965
PCT Pub. Date: Sep. 8, 2000

(30) Foreign Application Priority Data

Mar. 1, 1999 (SE) ............................................. 9900718

(51) Int. Cl.⁷ ................................................ H05B 6/10
(52) U.S. Cl. ....................................... 219/645; 219/653
(58) Field of Search ................................ 219/645, 653, 219/602, 635, 636, 643, 656, 655; 419/36; 164/155.4; 432/8, 59

(56) References Cited

U.S. PATENT DOCUMENTS

| | | | |
|---|---|---|---|
| 1,749,700 A | | 3/1930 | Fourment |
| 3,615,909 A | | 10/1971 | Grasshoff |
| 3,711,342 A | | 1/1973 | Cullen et al. |
| 4,106,757 A | | 8/1978 | Jackson |
| 4,830,686 A | | 5/1989 | Hashiguchi et al. |
| 5,308,946 A | * | 5/1994 | Mohr .......................... 219/645 |
| 5,403,994 A | | 4/1995 | Havas et al. |
| 5,472,528 A | | 12/1995 | Boyer |
| 5,990,464 A | * | 11/1999 | Hino et al. .................. 219/602 |

FOREIGN PATENT DOCUMENTS

| | | |
|---|---|---|
| DE | 2430561 | 1/1976 |
| EP | 0271614 | 6/1988 |
| EP | 0822733 A1 | 6/1998 |
| FR | 846023 | 9/1977 |
| GB | 2155740 A | 9/1985 |
| JP | 61257430 | 11/1986 |
| JP | 10298668 | 11/1998 |
| WO | WO 96/26296 | 8/1996 |

OTHER PUBLICATIONS

PCT International Search Report.
Derwent's Abstract, No. 1995–077403, week 199511, Abstract of JP 7001003 (Kawasaki Steel Corp.).

* cited by examiner

Primary Examiner—Quang T. Van
(74) Attorney, Agent, or Firm—Nixon & Vanderhye

(57) ABSTRACT

The invention concerns heating metal strips or other coilable strand metal object to an elevated temperature, wherein the metal object is passed in a heating section through a furnace chamber that is made at least partly of an insulating and electrically non-conductive material while being heated through transverse flux induction heating (TFIH) by transverse flux induction heating elements located outside of the chamber which contains a protective non-oxidizing gas or gas mixture. The metal object is of stainless steel that has been cold rolled to a very high degree of surface reflectivity. The cold rolled stainless steel object is passed through the furnace chamber and is heated in the chamber to a processing temperature between 700 and 1200° C. The cold rolled stainless steel object is maintained at that temperature between 700 and 1200° C. long enough for the steel to recrystallize completely, and the heat treated metal object then is rapidly cooled directly from the processing temperature in an airtight cooling section through which the non-oixidizing gas is passed to a temperature below 600° C.

8 Claims, 5 Drawing Sheets

METHOD OF HEATING METAL STRIP AND APPARATUS THEREOF

TECHNICAL FIELD

The invention concerns a method of heating metal strips or other coilable strand metal object to an elevated temperature without oxidation of said metal object, which is oxidisable in air at said elevated temperature wherein the metal object is passed in a heating section through a gas tight heating chamber that is made at least partly of an insulating and electrically non-conductive material while being heated by action of at least two opposite walls of the heating chamber through transverse flux induction heating by means of transverse flux induction heating elements located outside of said chamber which contains a protective non-oxidising gas or gas mixture.

The invention also concerns an apparatus for heating a metal strip or other coilable metal object to an elevated temperature without oxidising said metal object which is oxidisable in air or other oxidising gas at said elevated temperature, wherein the apparatus comprises a gas tight heating chamber through which the metal object is provided to be passed, said chamber being made at least partly of an insulating and electrically non-conductive material and containing a protective, non oxidising gas, said heating chamber having entrance and exit ports for the metal object at the ends thereof, and wherein transverse flux induction heating elements are located opposite to each other outside the heating chamber for transverse flux induction heating of said metal object by action of flux induction heating elements through two opposite walls of the heating chamber as the metal object, is being conveyed through the chamber.

Further, the invention concerns a process line forming an integrated furnace for heat treating a metal strip or other coilable strand metal object, including an entry end and an exit end; a passage-way for the strand object extending along the process line from the entry end to the exit end, said passage-way being enclosed against the ambient environment; the process line further including an apparatus for heating said metal strip or other coilable strand metal object to an elevated temperature without oxidising said metal object which is oxidisable in air or other oxidising gas at said elevated temperature, wherein the apparatus comprises a gas tight heating chamber through which the metal object is provided to be passed, said heating chamber forming part of said enclosed passage way and being made at least partly of an insulating and electrically nonconductive material and containing a protective, non-oxidising gas, wherein transverse flux induction heating elements are located opposite to each other outside the heating chamber for transverse flux induction heating of said metal object by action of the flux induction heating elements through to opposite walls of the heating chamber as the metal object is being conveyed through the heating chamber, and a cooling section including a cooling chamber down-stream of said heating chamber, said cooling chamber also forming part of said enclosed passage-way.

BACKGROUND OF THE INVENTION

Strips of various types of metals and alloys strain harden when they are cold rolled, cold drawn, or cold stretched. Therefore they need to be heated and annealed in order to be re-crystallised. This particularly concerns stainless steel strips but is valid for metals in general. Conventionally, continuous annealing furnaces are used, which employ fuel or radiant electric heating in chambers through which the strip passes to be heated by conduction and/or radiation. The rate of heating is relatively slow, wherefore the overall furnace lengths need to be correspondingly long.

It is also known in the art to employ induction heating for heating metal strip and other strand metal objects. In principle, there exist two types of induction heating techniques; axial induction heating (AIH) and transverse flux induction heating (TFIH).

AIH is effected by passing an electric current through a wire, which is coiled around, but not touching, the metal to be heated. The electric current induces magnetic currents in the metal, whereby the metal is heated. To be heated in this way, the metal has to be essentially magnetic. Thus metals, such as copper, aluminium, and austenitic stainless steel, can not be easily heated by this technique.

TFIH employs electromagnets of opposite poles positioned on opposite sides of the metal to be heated. The action of passing a magnetic field through the metal heats the metal. The metal, in this case, needs to be electrically conductive but needs not to be magnetic. Thus also copper, aluminium, and stainless steel can be heated by this technique. The use of TFIH for heating metal strip is disclosed e.g. in GB 2 155 740 A, U.S. Pat. No. 4,585,916, EP 0 246 660 B1, EP 0 346 547 B1 and EP 0 667 732 A2.

A facility for producing cold rolled or finally annealed stainless steel strip normally includes at least two annealing sections; a preparatory annealing section and a bright annealing section. In the preparatory annealing section, hot rolled coil is heat-treated to make it easier to form during subsequent cold rolling. Because hot rolled austenitic steel strip, for example, will have a surface layer of scale remnant from the hot rolling process it is sufficient to anneal the strip at an appropriate temperature in a continuous annealing furnace which is open to the atmosphere (air). This process is followed by a descaling operation which removes the hot rolled scale and scale formed by the annealing process. After washing and drying the strip is in a condition suitable for cold rolling.

For surface critical intermediate annealing and final annealing, where a high degree of surface reflectivity is required, it is necessary to protect the surface of the strip from oxidation. This is effected in a continuous strand furnace which contains a protective, non-oxidising gas. Such furnaces can employ direct radiant heat aided by the conduction of the protective gas or by indirect radiant heat from a metal retort, which contains the protective gas and which, is externally heated. A main drawback with these prior art methods is that radiant heating, particularly radiant heating via a gas medium, is a slow process. Annealing furnaces of this type therefore are usually relatively long because of the time needed to raise the temperature of the strip throughout its thickness to the desired annealing temperature and in order to maintain an adequate throughput rate. Thus the capital cost of such furnaces is relatively high. In spite of these drawbacks, this type of annealing furnaces are regularly employed also for new installations, while use of the TFIH technique in practice basically has been restricted to the non-ferrous industry, typically for heating copper and aluminium strip materials to moderate temperatures.

DISCLOSURE OF THE INVENTION

It is the object of the invention to suggest a method and provide an apparatus and a process line which enable the above mentioned disadvantages to be overcome. Accordingly, the invention suggests a method as defined in the above preamble in which the metal object to be heated is a stainless steel object that has been cold rolled to a very high degree of surface reflectivity; the cold rolled stainless steel object is passed through said heating chamber and is heated in said chamber to a processing temperature between 700 and 1200° C. the cold rolled stainless steel object is maintained at said temperature between 700 and 1200° C. for long enough for the steel to recrystallize completely; and the heat treated metal object then is rapidly cooled directly from the processing temperature, in an airtight cooling section through which the non-oxidising gas is passed, to below a temperature of 600° C.

Within the above temperature range, for example, austenitic stainless steels may continuously be annealed at temperatures in the range 1050–1200° C., the exact choice of temperature for each grade depending on its specific chemistry. In contrast, cold rolled martensitic stainless steels may be softened in the heating chamber in the range 700–800° C., again depending upon their specific chemistry.

The protective gas may in principle be any gas that does not oxidise the metal to be heat treated at the annealing temperature or is otherwise reactive but consists suitably of hydrogen or any other reducing gas or gas mixture, e.g. hydrogen mixed with nitrogen or argon.

The invention has been developed in the first place for bright annealing stainless steel strip, which can vary in width from typically 200 mm to 1500 mm. It is the object of the invention that strips with different widths, but with a ratio between broadest and narrowest conceivable strip not exceeding 2:1, can be heated in the apparatus. Therefore the heating enclosure is made so wide that it can accommodate the broadest strip to be heated in the heating line. Further, in order to achieve good heating efficiency of the transverse flux induction heating elements, the inductors may be positioned close or adjacent to the broad sides of the heating chamber or enclosure wherein cooling channels may be provided between the chamber walls and the inductors. The inductor faces may also be insulated from excessive heat by a covering of heat insulating material, which is non-electrically conductive.

As understood from the above the heating chamber is comparatively narrow in the direction perpendicular to the plane of the strip. The value of this dimension depends on the physical characteristics of the strip to be heated but should be as small as possible to effect maximum heating from the inductors. Because of the relatively high rate of heat input attainable with transverse flux induction heating the length of the heating chamber is short in comparison to furnaces employing conventional heat sources. Because the dimensions of the heating chamber are small in comparison with conventionally heated annealing furnaces the volume of protective gas required is correspondingly small adding to the cost efficiency of the process.

The design of the heating chamber may be either a tube (muffle) or an enclosure having entrance and exit ports for the strip, in which chambers the heat insulation structures (boards) at least span the chamber parallel to the plane of the strip, the dimension of the chamber perpendicular to the plane of the strip being relatively small. Typically it has a generally rectangular cross section, but the shape can also be an elongated oval or have other cross-section.

According to an aspect of the invention, which concerns the apparatus mentioned in the preamble, the protective gas contained in said heating chamber at least substantially consists of hydrogen, wherein the assembly which comprises said outer chamber and said transverse flux induction heating elements which are located opposite to each other outside the chamber, is enclosed in a gas tight enclosure which contains a non-explosive gas capable of acting as a safety shroud in case of accidental rupture of the chamber which contains hydrogen.

According to another aspect of the invention, which concerns the process line, the enclosed passage-way also includes an entrance section between said entry end and said heating chamber and an exit section between said cooling chamber and said exit end, wherein at least one gas conduit is connected to said entrance section and at least one gas conduit is connected to said exit section for replenishing losses of protective gas from the integrated furnace by fresh protective gas from a source of protective gas and for maintaining a positive pressure in the furnace to prevent air from entering the system. Provisions also are suggested to control and/or to minimise any flow of gas through the heating chamber.

Further, according to another aspect of the process line when adapted to heating a metal strip, the process line includes at least one sensor for registering the lateral position of the strip edges relative to the TFIH elements and/or to shading plates located on both sides of the heating furnace between the TFIH elements and the heating chamber; a control unit to which the output signals from said at least one sensor is transmitted and in which the output signals are converted; and motions means controlled by said control unit in dependency of said signals transmitted to the control unit and converted there, which motion means serve to move the TFIH elements and/or the shading plates located between the TFIH elements and the heating chamber to maintain a desired lateral position of the strip edges relative to the TFIH elements and/or to the shading plates.

It is also possible, in the process line of the invention; to combine the TFIH with a conventionally heated unit as a pre heating section where a particularly long soak is required in order to dissolve undesirable phases in the microstructure of the steel and/or in order to achieve desired properties in the material.

Further, in the process line of the invention, it is also possible to combine the TFIH with a conventional electrical heating by means of radiating heating elements in an additional or auxiliary, conventional bright annealing furnace section subsequent to or, possibly, before the TFIH bright annealing section.

TFIH, as employed according to the present invention, primarily is a method of rapid heating. This, however, does not exclude that TFIH, according to a conceivable version of the method of the invention, advantageously can be employed also for applications where it is necessary to control the rate at which a metal needs to be heated. Thus, for thin gauge strip, there might be need for a more gradual heat up rate to operating temperature to avoid distortion. This can be achieved by considered choice of multiple inductors, i.e. a low power inductor to heat the metal relatively slowly part way to the decided final temperature, followed by one or more inductors of higher power for the remainder of the heating cycle. For this application, the term gradual therefore is more appropriate than rapid, as far as the heating rate is concerned, although the heating is more rapid than can be achieved by conventional heating units.

AC power is supplied to the inductor or inductors. For ferrous materials the frequency can be anything between 200 Hz to 3000 Hz or more with power ratings up to 3 MW or more. The selection depends on the strip or other strand dimensions and the required or desired throughput rate.

The invention can be employed also for other heating applications than in connection with annealing operations, but its main advantage is where space is limited and/or where a conventional heating unit is costly.

Further characteristic features and aspects of the invention will be apparent from the following description of some embodiments thereof and from the appending claims.

BRIEF DESCRIPTION OF DRAWINGS

The invention will now be described in more detail with reference to the accompanying drawings, in which FIG. 1 very schematically illustrates the principles of the invention according to a first preferred embodiment.

DETAILED DESCRIPTION OF THE INVENTION

Figure 1:
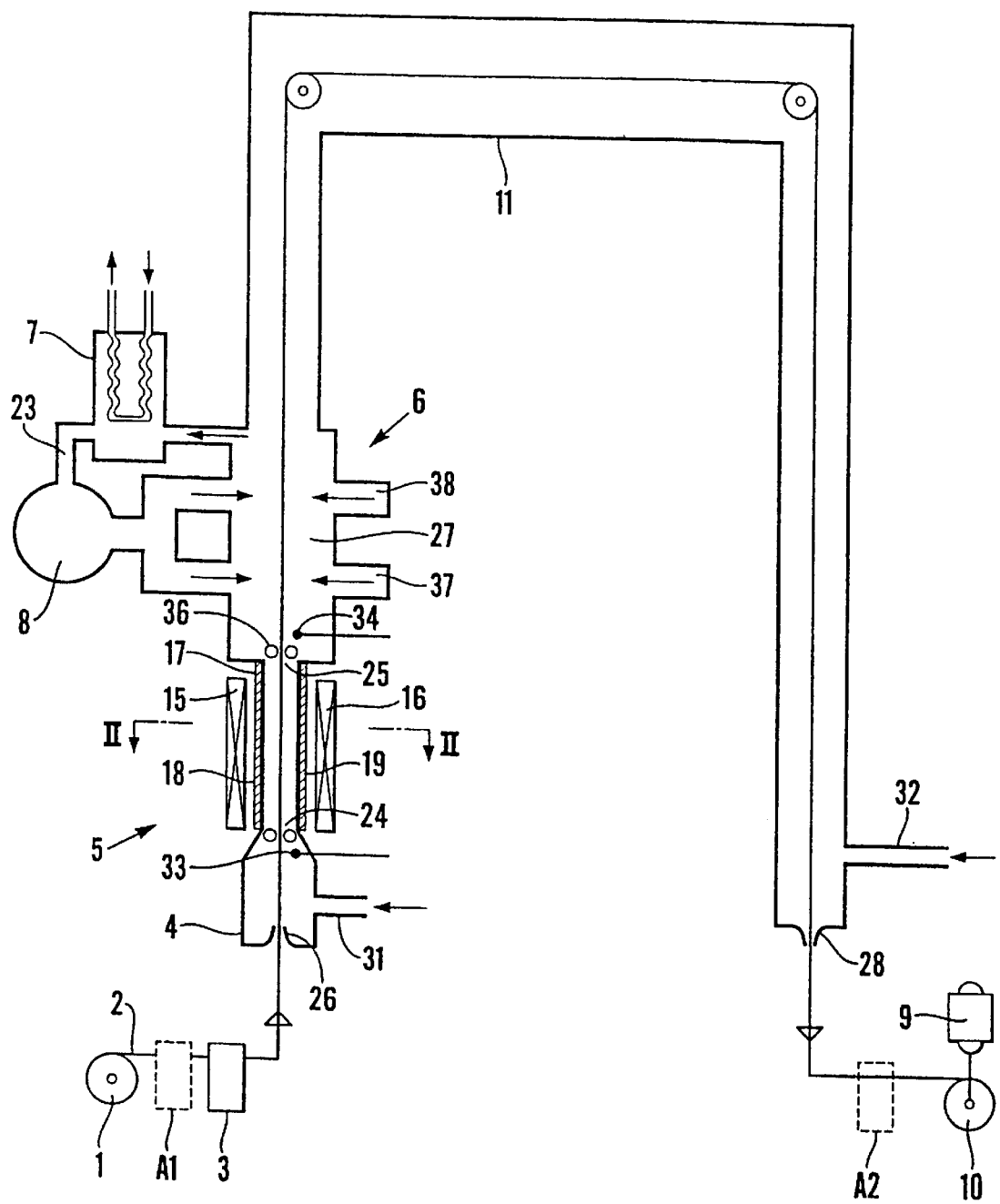

FIG. 1 very schematically illustrates a bright annealing line, which can be included in a cold rolling mill for producing stainless steel strip with very high degree of surface reflectivity. The bright annealing line illustrated in FIG. 1 comprises an uncoiling capstan 1 for uncoiling a strip 2 of cold rolled stainless steel, a degreasing unit 3, an entrance section 4, a transverse flux induction heating (TFIH) section 5, a cooling section 6, an exit section in the form of an elongated chamber (tunnel) 11 following the cooling section 6 and a re-coiler 10, which takes up the bright annealed steel strip. Further, the line includes a heat exchanger 7 for cooling used and heated protective gas before recycling for repeated use, a fan 8 for blowing cooled, recirculated protective gas into the cooling section 6, a motion means (a motor) 9 for advancing the steel strip 2 through the line, and a number of guiding and tension rolls which have not been indicated by numerals. It should be understood that the line also may include auxiliary equipment such as shear and welding units, loopers, tension rolls and the like and other conventional or unconventional members and means for continuously conveying a metal strip and a protective gas through a bright annealing line. Such auxiliary equipment is represented and indicated by reference numerals A1 and A2.

In the bright annealing section 5 there are provided a TFIH element 15 and 16 on each side of the strip 2, and between the two TFIH elements, a furnace chamber in the form of a muffle 17, through which the strip 2 is conveyed. The muffle 17 extends along the entire length of the TFIH section 4 and beyond the ends of the TFIH elements 15 and 16.

Figure 2:
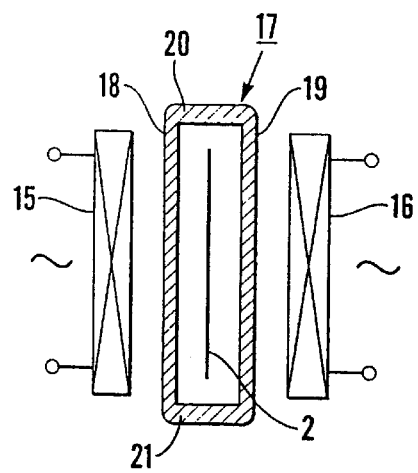
FIG. 2 very schematically shows the TFIH section along a line II—II in FIG. 1.

With reference now also to FIG. 2, the muffle 17, according to the embodiment consists of a comparatively flat tube with rectangular cross section. Two broad sidewalls 18 and 19 face the TFIH elements 15 and 16, respectively. The breadth of the inside surface of the broad walls 18 and 19 exceeds the maximum width of any strip 2 intended to be processed in the annealing line. The end walls square to the broad sidewalls 18 and 19 are designated 20 and 21, respectively. The distance between the inner surfaces of the broad side walls 18 and 19 are as small as is possible for the strip 2 to be conveyed through the muffle 17 without touching the walls of the muffle and may amount to about 25–100 mm, preferably only to 35–60 mm.

The muffle, according to the embodiment, is fabricated from heat insulating and electrically non-conducting ceramic material in sheet form, although also other insulating and electrically non-conductive materials may be employed. It is conceivable that the muffle may be cast, or produced by spray techniques, if the nature of the chosen ceramic material allows. In order to provide a muffle having sufficient mechanical strength, the end walls 20 and 21 may be made considerably thicker than the broad sidewalls, 18 and 19, facing the TFIH elements 15 and 16. It is also possible to provide stiffening means outside and/or inside of the broad sidewalls 18 and 19 for strengthening purposes by means of ribs and or a laminated construction. A most convenient cross section shape of the muffle might be an elongated oval, especially when a spray technique is employed for the manufacturing of the muffle.

Ideally the muffle should be gas tight. However it is possible to enclose the assembly (muffle and inductors) in a gas tight enclosure which could contain a non-explosive gas which would act as a safety shroud in case of accidental rupture of the muffle or permeation of gas through the muffle. In the case of a design of the chamber type, the outer section containing the inductors could also contain a protective gas. In the case of either construction method the gas surrounding the muffle or annealing chamber might contain the same gas as that present in the annealing chamber. If this gas is inherently explosive if exposed to the atmosphere at annealing temperatures a rapid purging of the complete furnace with an inert gas would be advisable in line with common safety practice for furnaces of conventional design.

A rectangular entrance port 24 of the muffle 17 is connected in a gas tight manner to the first, entry, tubular section 4. The entry tube 4 may be made of steel sheet and have a rectangular cross section but dimensionally greater than that of the muffle. The entry tube 4 has at its inlet a device such as seal rolls or felt sealing pads 26 in order to prevent ingress of air to the furnace. A rectangular exit port 25 of the muffle 17 is connected in an airtight manner to a cooling chamber 27 in the cooling section 6, where prior cooled protective gas is directed to both surfaces of the strip sufficiently rapidly to cool the strip at a rate necessary to complete the annealing process for the strip, typically at a rate of 100° C./s for stainless steel. The device for cooling and recirculating the cooling gas is typically a heat exchanger 7 augmented by refrigeration as necessary. The gas is circulated through the cooling chamber 27 and through the heat exchanger 7 by means of the fan 8 arranged in a branch conduit 23.

The remainder of the structure includes the exit section 11 which consists of a tube of similar construction to the entry tube 4 and which in turn terminates with a device 28 to prevent ingress of air to the system.

Although sealings 26 and 28 are provided at the entrance and exit ends of the integrated furnace, gas losses cannot be completely avoided. Such losses are replenished by fresh protective gas that is introduced into the entrance and exit sections 4 and 11 through conduits 31 and 32, respectively, from a source, not shown, of protective gas. Most conveniently, from an economical point of view, there should not be any flow of gas through the muffle/heating chamber 17. At least the gas flow through the muffle 17 should be controlled, if not stationary, to be low to reduce cooling of the strip by the gas and to promote a rapid and uniform heating of the strip 2 that is passing through the muffle. Therefore, the gas pressure in the entrance section 4 and in the cooling section in the vicinity of the entrance and exit ports 24 and 25 of the muffle 17, respectively, should be equal or controlled, the muffle being void of any gas inlet or outlet openings between said entrance and exit ports. Therefore, gas pressure sensors 33 and 34 may be provided in the vicinity of the said entrance and exit ports 24 and 25, respectively. The said sensors 33 and 34 are connected to a control unit, not shown, for transmitting the measured gas pressure values to the said control unit for the purpose of regulating the flow of fresh protective gas through the conduits 31 and 32 to the entrance and exit sections 4 and 11 in order to maintain a gas pressure equilibrium, or a control pressure difference, on the entrance and exit sides of the muffle 17, wherein flow of gas through the muffle can be controlled to be low or minimised. Adjacent to the entrance and exit ports 24 and 25 of the muffle, there are also provided rolls 35 and 36, which guide the strip and also help to reduce gas movement.

The bright annealing line and equipment illustrated in FIG. 1 and 2 operate in the following manner. The stainless steel strip 2, which is assumed to have been cold rolled to a very high degree of surface reflectivity, is uncoiled from the capstan 1 and is degreased in the degreasing unit 3 before it enters the entrance port of the entry tube 4 of the TFIH section 5. When the strip enters the muffle 17 of the TFIH section 5, it is immediately heated by the action of the transverse flux induction elements 15, 16, and also by the hot protective, stationary gas existing in the muffle, to the desired annealing temperature which for stainless steel can be in the range 700 to 1200° C. and is maintained in the muffle at this temperature for long enough for the steel to recrystallize completely. A typical length of muffle 17 is 2 meters. Since the hot strip is protected by a protective gas, suitably hydrogen or possibly nitrogen or argon and/or any other inert gas, the surfaces of the hot strip will not oxidise which it would do at that temperature in contact with air or other oxidising gas.

When the strip has been heated correctly it passes in to the cooling section 6 where it is cooled down in the cooling chamber 27 by means of pre cooled protective gas blown on to the strip surfaces by means of the fan 8 through two angular gas entrance chambers 37 and 38, which surround the strip to be cooled, such that the rate of heat loss is at least 100° C. per second to below a temperature of 600° C. in the case of austenitic stainless steel. When the strip has exited the cooling section 6 it passes through the long tunnel 11 following the cooling section 6, loosing heat until it exits to the atmosphere at a temperature no greater than 100° C. Finally the strip is coiled on the re-coiler 10.

Figure 3:
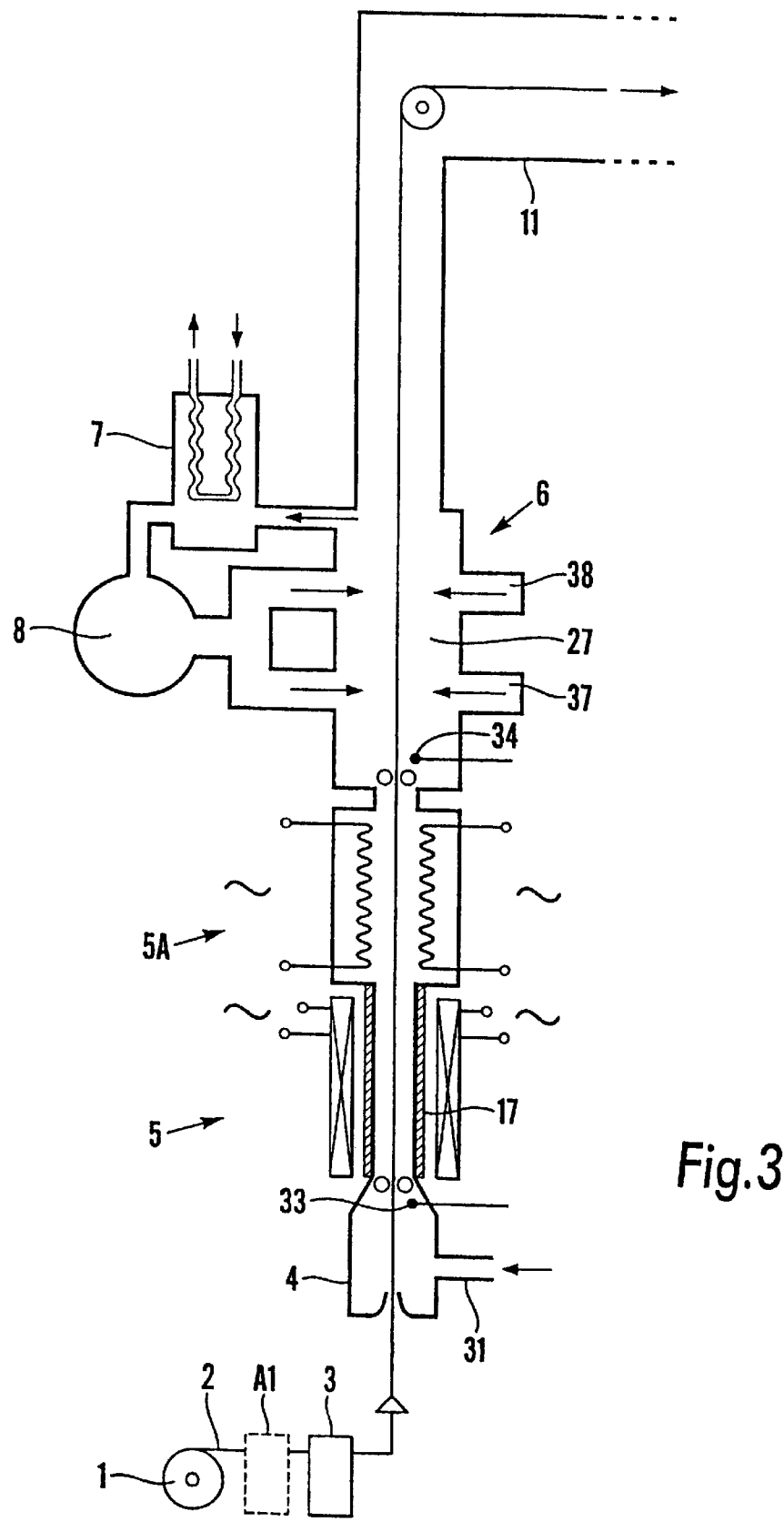
FIG. 3 very schematically illustrates a heating line in which a TFIH section is combined with a complementary bright annealing section of a more conventional type.

With reference now to FIG. 3, an additional or auxiliary, conventional bright annealing section 5A is provided between the TFIH section 5 and the cooling section 6. This configuration allows extra time for soaking the strip at the annealing temperature for alloys in which recrystallization is relatively slow. The gas pressure sensors 33 and 34 in this case suitably are located in the vicinity of the entrance port of the funnel 17 and in the vicinity of the exit port of the auxiliary bright annealing section 5A, respectively, in order to prevent flow of protective gas through the two heating sections 5 and 5A but instead to keep the gas stationary not only in the muffle 17 but also in the auxiliary heating section 5A. In other respects, the equipment is similar or identical to that described with reference to FIGS. 1 and 2.

Figure 4:
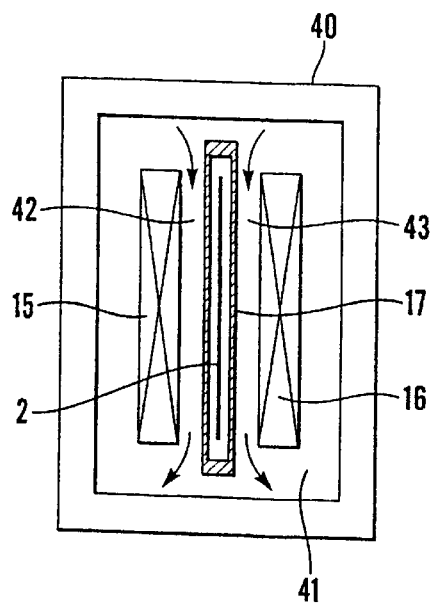
FIG. 4 very schematically illustrates an embodiment of the TFIH section where a muffle in an outer enclosure is employed.
Figure 5:
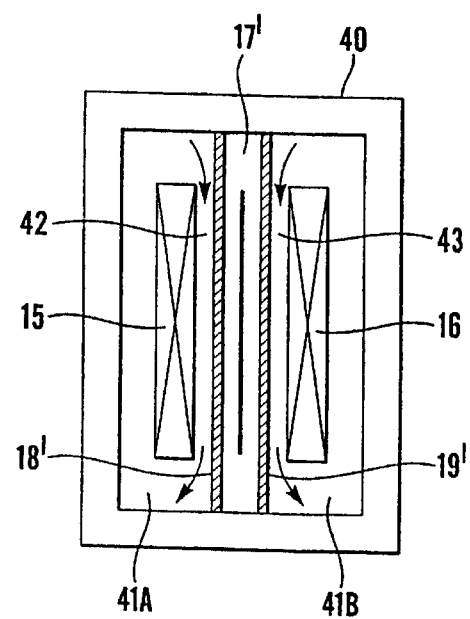
FIG. 5 very schematically illustrates an embodiment of the TFIH section where a heating chamber integrated with an outer enclosure is involved.

As mentioned in the foregoing, it is possible to enclose the TFIH assembly (inductors 15, 16 and muffle 17) in a gas-tight enclosure which could contain a non-explosive gas which would act as a safety shroud in case of accidental rupture of the muffle. Such a construction also can serve for cooling the inductors 15, 16, which otherwise run a risk to be damaged because of heat radiation from the broad muffle walls 18, 19. FIG. 4 and FIG. 5 illustrate two embodiments.

According to FIG. 4, an outer enclosure 40 made of refractory lined steel encloses the inductors 15 and 16 and the muffle 17. The space 41 inside the outer enclosure 40 is filled with a non-explosive gas, e.g. nitrogen, the muffle containing a protective gas, which can be hydrogen, i.e. a gas that is explosive if mixed with air. Provisions also can be made for circulating the non-explosive gas in the space 41, wherein the gas flow particularly is directed through the gaps 42 and 43 between the inductors 15, 16 and the muffle 17. The non-explosive gas inside the outer enclosure 40 suitably is circulated through a cooling system including a fan and a heat exchanger similarly to what has been described with reference to the cooling section 6 in the foregoing.

According to FIG. 5, the chamber in the TFIH section, is designated 17'. The chamber 17' is made of two boards 18' and 19' forming the broad side walls of chamber 17', said boards 18' and 19' extending between and being connected with two opposite end walls of the outer enclosure 40. The chamber 17' forms a partition of the outer enclosure 40 separating two chambers 41A and 41B containing inductor 15 and inductor 16, respectively. The two chambers 41A and 41B are filled with non-explosive gas, e.g. nitrogen, which circulates for cooling the inductors and the outer surfaces of the walls 18' and 19' of the chamber 17'. Also in this embodiment, fans and heat exchangers, which may include one or more refrigerators, may be included in the system.

Figure 6:
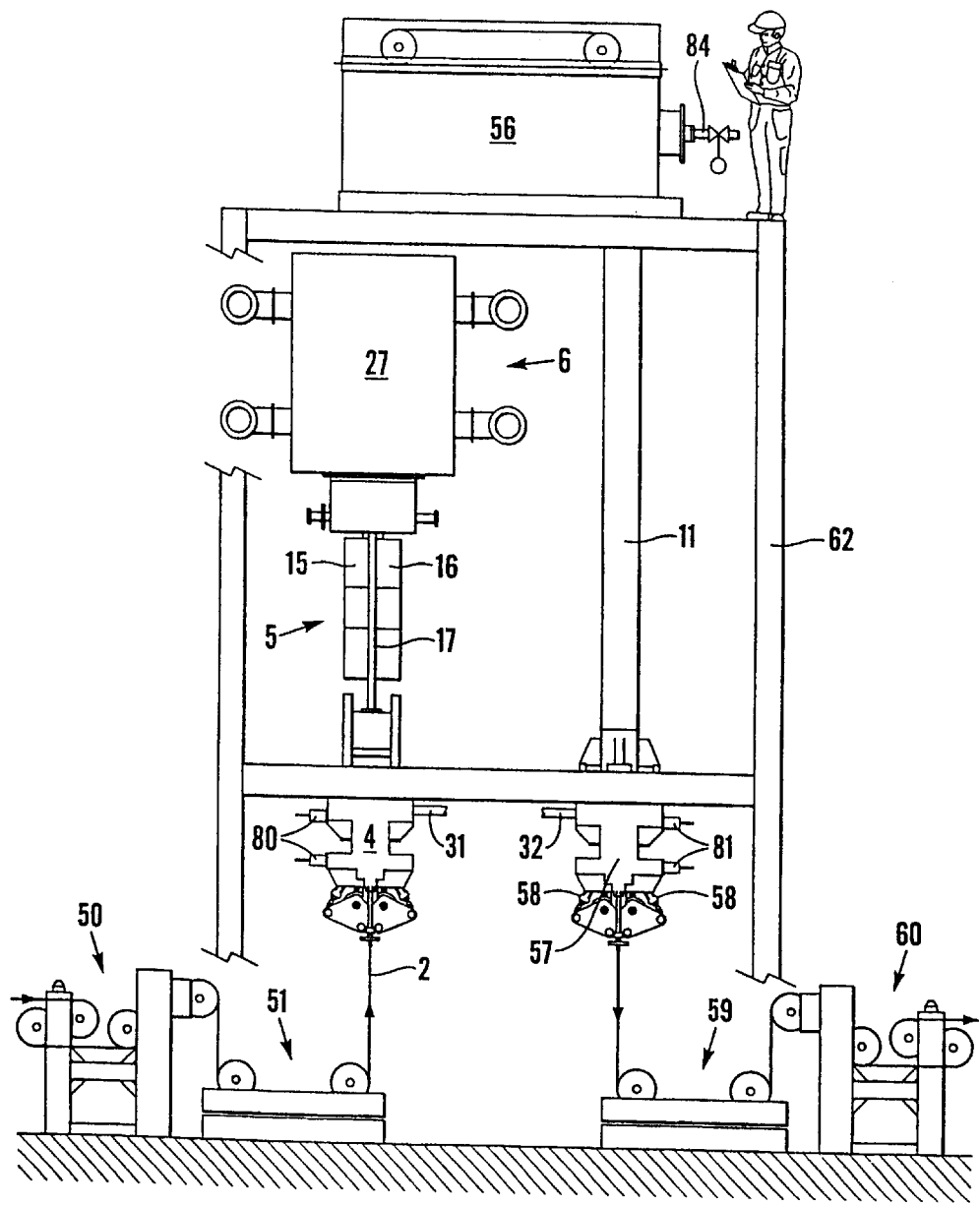
FIG. 6 shows an embodiment of a process line more in detail, in which the method of the invention can be employed.

The process line and integrated furnace shown in FIG. 6 in principle is based on the concept which has been described in the foregoing with reference to FIG. 1 and FIG. 2. The same reference numerals have been used for corresponding details.

Figure 7:
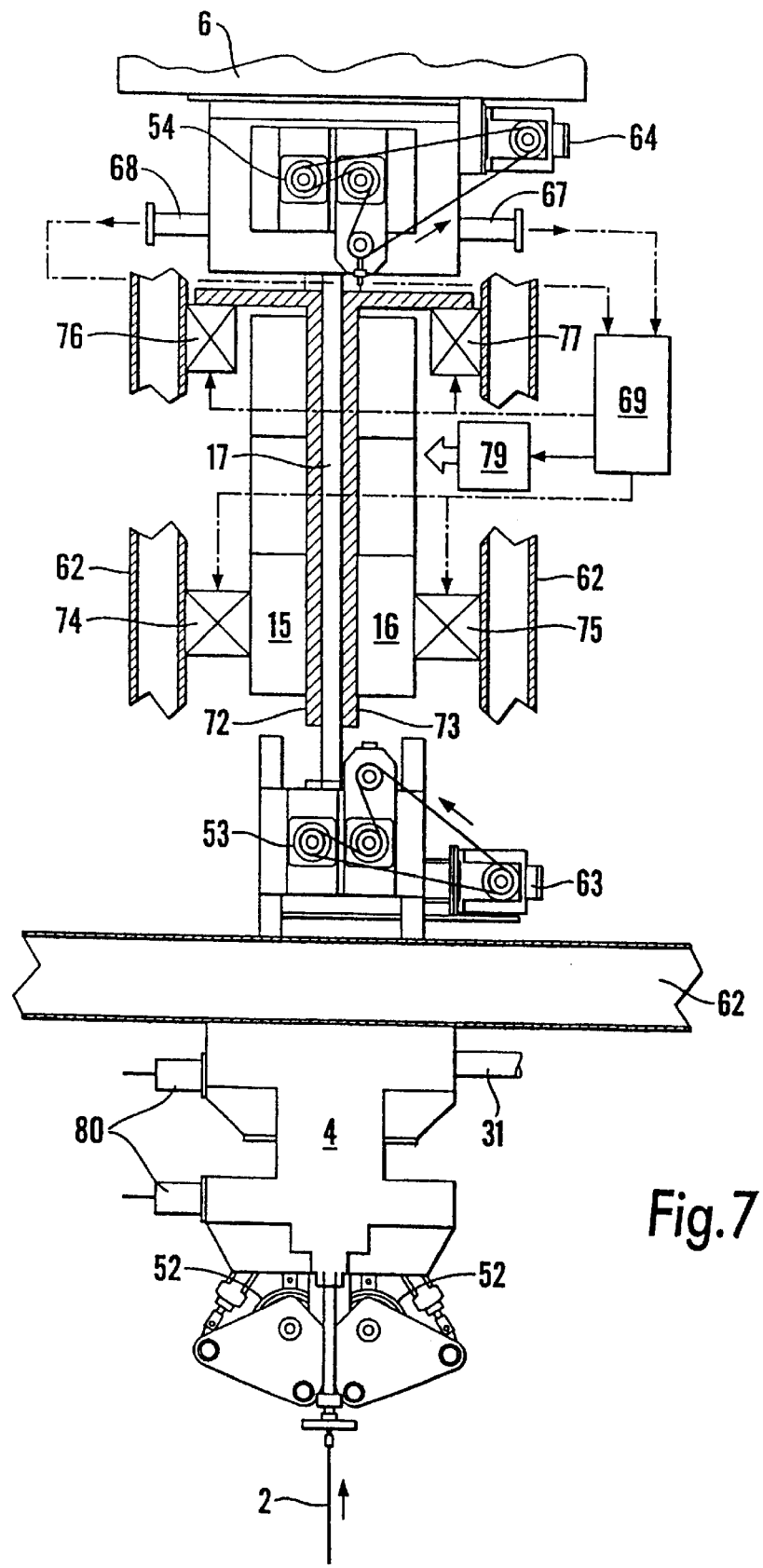
FIG. 7 shows a part of the process line at a larger scale, wherein some details of the equipment are shown only schematically.

Now with reference also to FIG. 6 and FIG. 7, the process line, which is defined for the annealing of a stainless steel strip, comprises a furnace entry bridle 50, a furnace entry steering 51, designed entry seal rolls 52 (FIG. 7), an entrance section 4 with a conduit 31 for introducing fresh protective gas and first shut off gates 80, a pair of furnace in-going graphite rolls 53 (FIG. 7), a heating section 5 containing the furnace muffle 17 of the same type as has been described in the foregoing, TFIH elements 15 and 16 on each side of the muffle 17, a pair of out-going graphite rolls 54 (FIG. 7), a top steering unit 56 with a valved outlet pipe 84, the tunnel 11, an exit section 57 with a conduit 32 for supplying fresh protective gas also at the exit end and second shut off gates 81, a pair of exit seal rolls 58, a furnace exit steering 59, and a furnace exit bridle 60. A supporting frame is generally designated 62.

The prime objective of the graphite rolls 53, 54 is to restrict gas movement and radiant heat loss from the transverse flux induction heated metal strip 2 in the muffle 17 into the cooler areas upstream and downstream of the graphite rolls 53 and 54, respectively. The graphite rolls 53 and 54 also serve to guide the strip 2 in the centre between the walls 18, 19 (FIG. 1) of the muffle 17. The rolls, however, do not touch the strip; a minimum gap between the rolls and the strip is 2 mm, so they have no effect upon tension of the strip within the furnace. This is controlled by the furnace exit bridle 60. The graphite rolls 53, 54 are driven by speed controlled DC motors 63 and 64, respectively. The motors are controlled such that the peripheral speed of the rolls is the same as the strip speed. This is to ensure that if and when the strip comes in contact with the rolls, both are moving at the same speed and scratching of the strip does not occur. Also the use of graphite as a roll material may have some benefit toward that end, but also other roll materials can be used as well. The roll material, whether it is graphite or any other chosen, heat resistant roll material, is softer than the steel strip, so in the event of a malfunction of the rolls, it is the rolls that get damaged rather than the stream.

From a pure economical point of view, the gas in the muffle 17 should be stationary in order to avoid heat losses because of gas flow through the muffle. However, it is also desirable that the gas in the muffle is kept dry and clean, and also that the reducing capacity of the gas is maintained. Therefore the integrated furnace described with reference to FIG. 6 is designed on the basis that there shall be a continuous exchange of the atmosphere in the furnace. In the furnace of the invention, fresh gas is let in through conduits 31 and 32 in the entrance and exit sections of the furnace, while contaminated or "consumed", or in other words "used", gas is caused to escape from the furnace at a controlled rate through the valved outlet pipe 84 in the top section 56 of the integrated furnace. This means that, according to a preferred embodiment of the invention, a certain, controlled flow of fresh gas through the muffle 17 is achieved and that the direction of the gas through the muffle is the same as for the strip to be heated, i.e. from the cold inlet end towards the hot outlet end. This also means that the fresh gas that enters the inlet end is continuously heated through radiation from the strip as it moves through the muffle towards the outlet end of the muffle, wherein any undesired, harmful cooling of the heated metal strip because of the gas flow through the muffle is avoided.

Through control of the gas flow, the furnace also is maintained at a positive pressure of several inches water gauge, or at least 5" wg, to prevent air from entering the system.

On top of the heating section 5, between the funnel 17 and the out-going graphite rolls 54, a first sensor 67 and a second sensor 68 are provided. In the first sensor, which is a scanning pyrometer 67, a rotating mirror assembly is mounted inside a sensing head, which is fastened to the outside of the furnace, just above the chamber 17 and just below the out-going graphite rolls. There is a viewing slot in a side of the furnace such that for 60° of its rotation, the mirror is pointing inside the furnace. Any infrared light emitted by the hot strip, which is at such a distance from the mirror that the full width of the strip is seen by the mirror every revolution, is reflected by the mirror onto an infrared detector, also mounted inside the sensing head. This detector then provides processed signals to a computer in a control unit 69, which displays a variety of information regarding the temperature profile of the hot strip.

Transverse flux induction heating preferentially concentrates energy at the strip edges, which can lead to undesirably high temperatures at the edges, unless special precautions are taken to avoid this by precise location of the inductors 15, 16 in relation to the strip position and/or the by provision of shading plates 72, 73 between the inductors 15, 16 and the muffle 17 to control the energy provided to the edges. The inductors 15, 16 and/or the shading plates 72, 73 are laterally movable, i.e. parallel to the plane of the strip perpendicularly to the direction of the strip by motion means 74, 75 and/or 76, 77, respectively. The motion means include motors which are controlled by the control unit 69 in dependency on information transmitted to the control unit 69 from the scanning pyrometer 67 relating to the strip edge position, such that the position of the inductors 15, 16 will be adjusted by the motors 74, 75 to match with the position of the strip edges and/or such that the shading plates 72, 73 will follow the strip edges accurately so as to if avoid over-heating of the strip edges.

A second sensor 68 is a centre line pyrometer, which is a piece of equipment similar to a scanning pyrometer, but it does not use a rotating mirror. The device is set to view, through a ceramic tube, a point on the vertical centre line of the strip, at the same vertical height as the scanning pyrometer, but on the opposite face of the strip. It has a monitoring function within the inductor power control scheme, the power control being schematically shown by detail 79 in FIG. 7. The power requirement to the inductors 15, 16 is calculated as the amount of energy required to raise the temperature of the strip from the in-going temperature to the desired annealing temperature. The system then converts this to a power level and controls for that level by monitoring voltage, current and frequency.

In the entrance and exit sections 4, 57 the blast gates 80, 81 operate in the event of a fire in the area of the entry or exit seal rolls 52, 58. The gates close to prevent the ingress of air into the integrated furnace, as the seal rolls will undoubtedly fail in the event of a fire, so reducing the risk of an explosion. Also the supply of fresh protective gas through the conduits 31, 32 is shut at that possible event.

The invention is not restricted to the embodiments described in the foregoing, various modifications being conceivable. In the described examples, the strip is moved vertically upwards through the heating chamber, but also the opposite direction is possible, provided the cooling section in that case is placed beneath the heating chamber. Also other sensors than pyrometers of type described in the foregoing can be conceived for detecting the lateral position of the strip relative to the inductors and/or to the shadow plates and for control of the heat of the heated metal object as it leaves the heating furnace.

What is claimed is:

1. A method of heating metal strips or other coilable strand metal object to an elevated temperature without oxidation of said metal object, which is oxidisable in air at said elevated temperature, comprising:

passing said metal object in a heating section through a furnace chamber that is made at least partly of an insulating and electrically non-conductive material while being heated through transverse flux induction heating (TFIH) by transverse flux induction heating elements located outside of said chamber which contains a protective non-oxidising gas or gas mixture;

heating the metal in said chamber to a processing temperature between 700 and 1200° C., maintaining said metal at said temperature between 700 and 1200° C. long enough for the metal of said metal object to re-crystallize completely, said metal object being a stainless steel object that has been cold rolled to a very high degree of surface reflectivity;

annealing the stainless steel metal object at said processing temperature; and, when it has re-crystallized completely, cooling directly from the processing temperature at a rate of at least 100° C./s to below a temperature of 600° C. in a cooling section through which protective non-oxidising gas is passed, wherein the protective gas at least substantially consists of a reducing gas or gas mixture.

2. A method according to claim 1, wherein the protective gas in said furnace chamber is maintained substantially stationary.

3. A method according to claim 1, wherein the protective gas is caused to flow at a controlled rate through the furnace chamber in the same direction as the metal object is advanced through the chamber.

4. A method according to claim 3, wherein the strand metal object is passed along a passageway through an enclosure including an entrance section, said furnace chamber in which the metal object is heated, a cooling section in which the heated strand object is cooled, and an exit section, wherein fresh protective gas is introduced into said enclosure upstream of the furnace chamber and wherein used protective gas exits from the enclosure downstream of said cooling chamber at a controlled rate, providing said flow of protective gas at a controlled rate through the furnace chamber in the same direction as the strand metal object is advanced through the furnace chamber.

5. An apparatus according to claim 4, including means for circulating the non-explosive gas in the space inside said outer enclosure.

6. An apparatus according to claim 5, wherein the non-explosive gas which is circulated inside the outer enclosure is circulated through a cooling system.

7. A method according to claim 1, wherein the metal object is passed in a vertical direction through said furnace chamber.

8. A method according to claim 7, wherein the metal object is a strip, and the lateral position of the strip edges relative to the TFIH elements and/or to shading plates located on both sides of the heating furnace between the TFIH elements and the heating chamber is detected by at least one sensor, and the output signals from said at least one sensor are used to control motion means for moving the TFIH elements and/or the shading plates to maintain a desired lateral position of the strip edges relative to the TFIH elements and/or to the shading plates.

* * * * *